April 22, 1941.　　R. W. JOHNSON ET AL　　2,239,525
INTERCHANGEABLE MANUAL AND THERMOSTATIC CONTROL
DEVICE FOR LIQUID FUEL BURNERS
Filed Feb. 3, 1939　　2 Sheets-Sheet 1
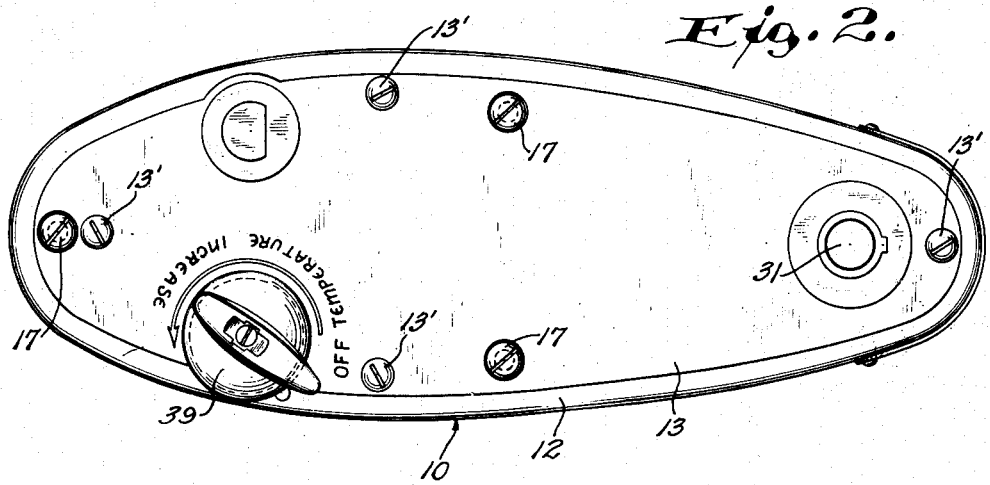
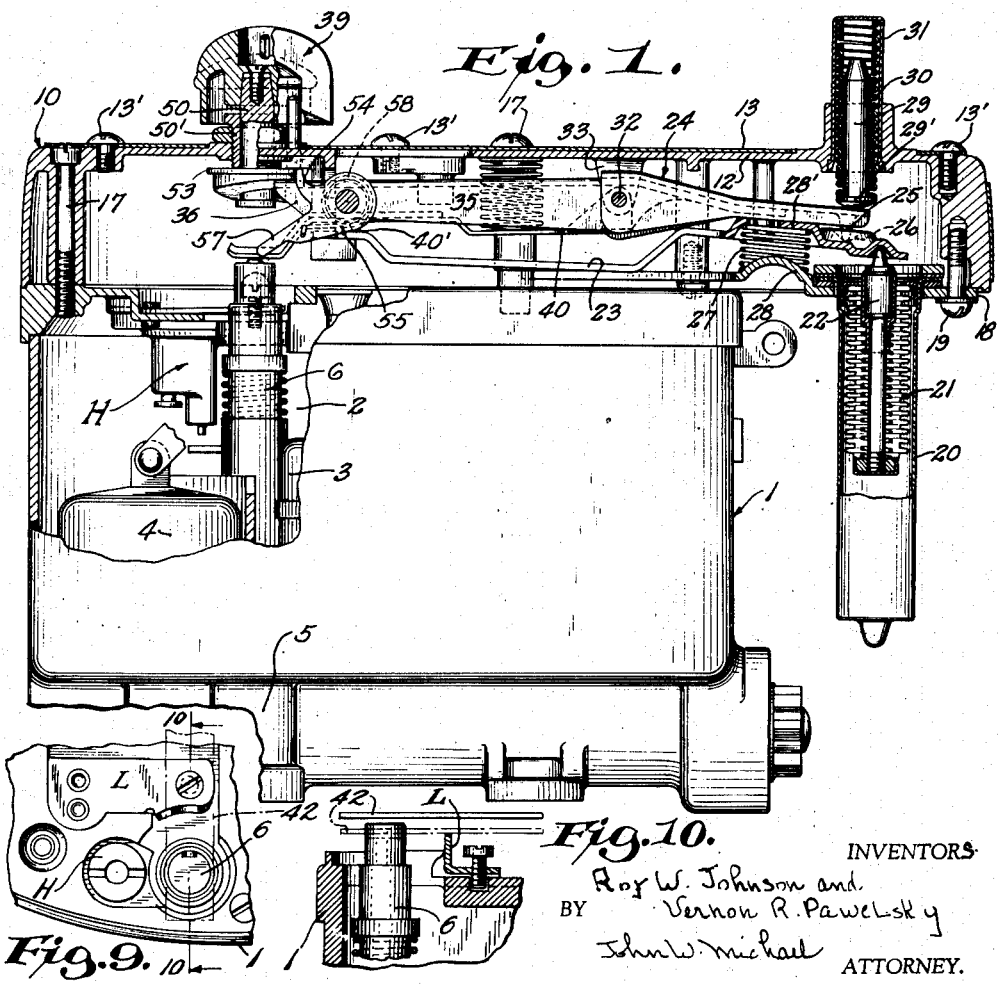
INVENTORS
Roy W. Johnson and
BY　Vernon R. Pawelsky
John W. Michael　ATTORNEY.

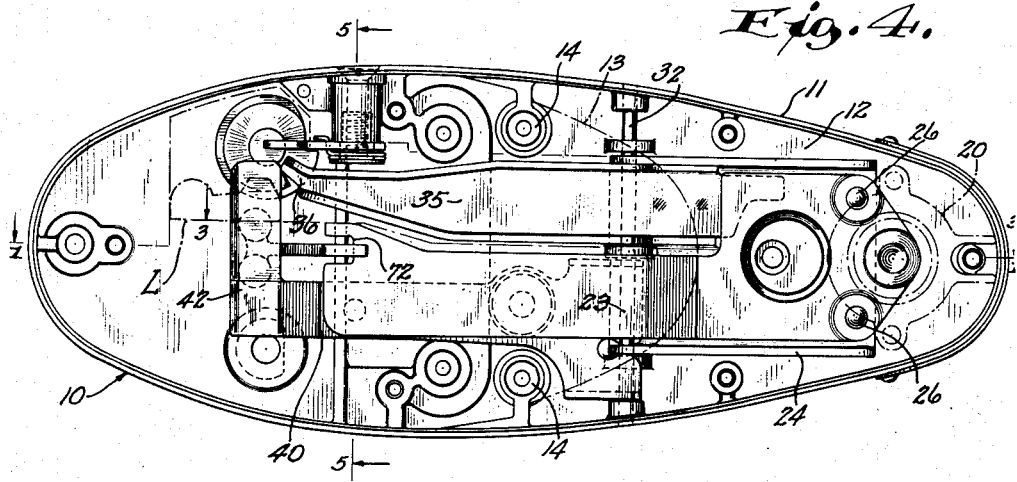
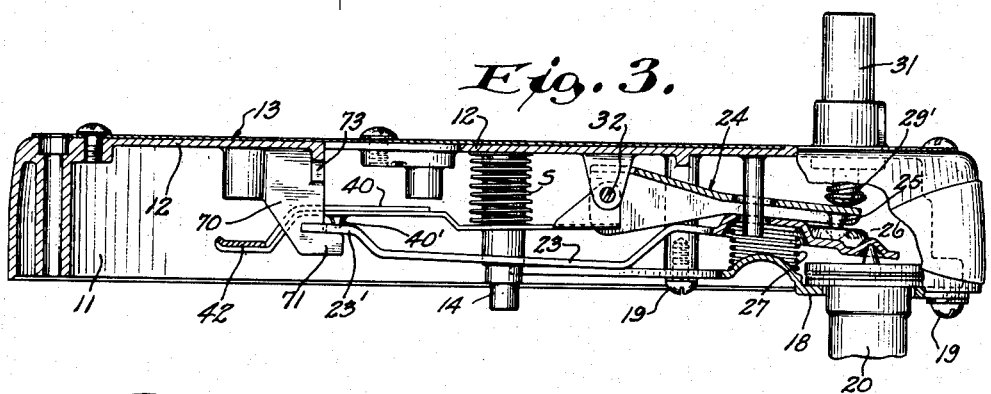
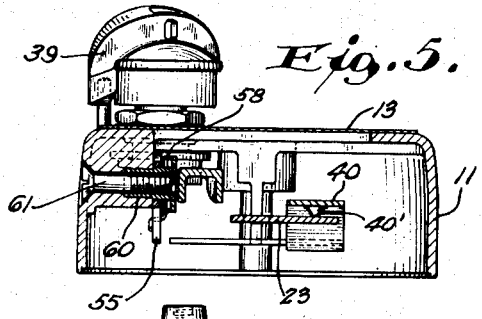
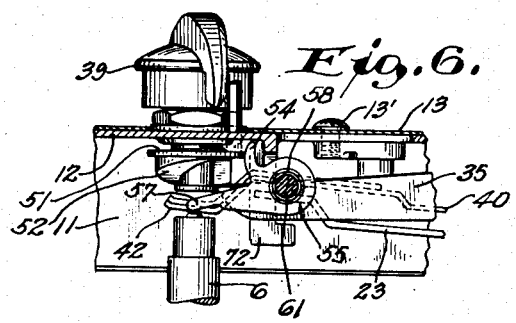
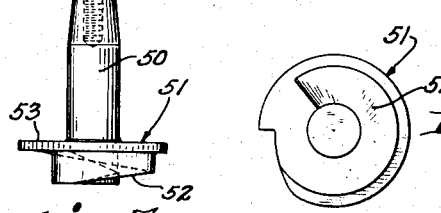
INVENTORS
Roy W. Johnson and
Vernon R. Pawelsky
BY John W. Michael ATTORNEY.

Patented Apr. 22, 1941

2,239,525

UNITED STATES PATENT OFFICE 2,239,525

INTERCHANGEABLE MANUAL AND THERMOSTATIC CONTROL DEVICE FOR LIQUID FUEL BURNERS

Roy W. Johnson and Vernon R. Pawelsky, Milwaukee, Wis., assignors to Automatic Products Company, Milwaukee, Wis., a corporation of Wisconsin Application February 3, 1939, Serial No. 254,406

7 Claims. (Cl. 236—99)

This invention relates to an improvement in liquid fuel feeding devices for oil burning space heaters of the type wherein the liquid fuel is fed from a liquid supply chamber to the burner under the control of a metering valve shifted toward and away from its seat to govern the rate of oil flow to the burner.

One of the objects of the present invention is to provide a device of this character which affords automatic control of the temperature maintained in the room or space being heated, which may be set or adjusted to maintain any desired temperature over a wide temperature range, and which accomplishes these purposes by means of a structure which is simple, compact and durable, which is reliable and efficient in operation and easy and comparatively inexpensive to manufacture.

Another object is to provide a liquid fuel feeding device of this character and having these advantages and which is so constituted that the automatic control mechanism for the metering valve may be built into the device at the factory or conveniently applied thereto in the field in lieu of a pure manual control. The device is particularly adapted for use as a conversion unit, that is, it makes it practical for an owner or user of a manually operated constant level oil control valve to convert his device into a thermostatically operated unit.

Generally speaking, the invention proposes to provide a charged thermostatic power element exposed to the temperature in the space to be heated and responsive to changes therein to actuate a novel system of levers interposed between the power element and the metering valve so that very small movement of the thermostatic element will be effective to change the position of the metering valve. The system of levers includes an actuating lever driven by the thermostatic power element, a valve operating lever engaged with the metering valve, and an intermediate adjustment lever providing a shiftable fulcrum for the actuating lever and itself controlled as to position by means of a manually operable control knob adjustable from the exterior of the casing enclosing the levers and having a cam cooperable with the adjusting lever for shifting the same. This same knob also controls a second cam which is cooperable with a shut-off lever and controls the position and action thereof so that upon pre-determined manipulation of the knob the metering valve will be completely closed. In all except one position of the knob the shut-off lever is retained in inactive or inoperable position and the knob is left free for adjustment so as to vary the setting of the device, that is, to vary the temperature which the thermostatic power element is operative to maintain.

Other objects and advantages reside in certain novel features of the construction, arrangement, and combination of parts which will be hereinafter more fully described and particularly pointed out in the appended claims, reference being had to the accompanying drawings forming a part of this specification, and in which:

Figure 1 is a view partly in side elevation and partly in longitudinal vertical cross section showing a liquid fuel feeding device embodying the present invention;

Figure 2 is a top plan view of the structure shown in Figure 1;

Figure 3 is a view in longitudinal vertical cross section taken on line 3—3 of Figure 4;

Figure 4 is a view in bottom plan of the control unit detached from the main casing of the device, the bottom plate being removed;

Figure 5 is a view in transverse vertical cross section taken on line 5—5 of Figure 4;

Figure 6 is a detail view partly in elevation and partly in vertical cross section showing the valve shut-off lever and cooperable parts;

Figures 7 and 8 are views in side elevation and bottom plan respectively of the knob controlled cams for the adjusting and shut-off levers;

Figure 9 is a fragmentary view in top plan illustrating the low fire stop in the manner in which it is related to the metering valve and the valve-operating lever; and Figure 10 is a fragmentary sectional view taken on line 10—10 of Figure 9.

Referring to the drawings, and more particularly to Figure 1, the numeral 1 designates the main casing of the device which is provided with a liquid supply chamber 2 in which a constant level of liquid is maintained by means of a suitable constant level device designated generally at 3 and equipped with a safety cut-off mechanism indicated at 4. The constant level mechanism and its safety shut-off mechanism are not shown and described in detail as they per se form no part of the present invention and are fully described and claimed in U. S. Letters Patent 2,068,138 granted to Roy W. Johnson, January 19, 1937, for "Device for controlling the flow of fuel to oil burners and the like."

The casing 1 is provided with one or more outlets, one of which is shown and is designated at 5. Each outlet is provided with a metering valve 6 which is tubular and has the usual slotted lower end cooperable with the valve seat formed in or on the outlet 5 to regulate or meter the flow of oil to the burner. The valve is biased to open position by means of a spring and is controlled as to its so-called high and low fire positions by high and low fire stops H and L respectively, all as fully shown and described and claimed in the application of Roy W. Johnson for "Interchangeable metering valve control," filed June 23, 1938, Serial No. 215,336.

Generally speaking, it has been the practice in this art to control the position of the metering valve either manually or thermostatically. The present invention provides a thermostatic control unit and so constitutes it that it may be built into the unit at the factory or may be combined therewith in the field, if it is desirable to convert a device of this kind from a manually controlled to a thermostatically controlled type.

The thermostatic control unit comprises a casing 10 which has a peripheral wall 11 and a top wall 12, the top wall having a removable name plate 13, screws 13' releasably securing the name plate 12 to the casing 10 in the assembly. Except at one end, the bottom of the casing 10 is open. Integral with the peripheral wall 11 are depending bosses 14 designed to interfit in the assembly with correspondingly formed sockets 16 on the casing 1 so as to accurately locate the control casing with respect to the main casing. Screws 17 releasably secure the control casing to the main casing or to the cover frame thereof.

As illustrated in Figure 1, one end of the control casing overhangs the main casing. The portion of the bottom of the control casing 10 comprehended within the confines of the overhanging portion of the casing is closed by a bottom plate 18 releasably secured to the casing 10 by screws 19. A thermostatic power element or bulb 20 is fastened to and supported by the bottom plate 18 of the control casing and depends therefrom. This bulb is filled with a liquid which contracts or expands as the temperature changes and thereby flexes the bellows 21 of the bulb 20 and shifts up or down the operating stem 22 of the power element.

The pointed tip of the operating stem 22 of the power element 20 is in driving engagement with one arm of an actuating lever 23 which is fulcrumed on an adjusting lever 24 by virtue of the engagement of downwardly directed pointed projections 25 on the lever 24 with conical depressions or sockets 26 stamped in the actuating lever 23.

The range of movement of the actuating lever 23 is limited by a stop preferably in the form of a plate 70 which is secured to and depends from the top wall of the control casing 10 (see Figure 3) and has a stop lug 71 at its lower end underlying the actuating lever to limit its swinging movement in one direction. The actuating lever has a notch 72 which straddles the stop plate 70. Adjacent its upper end the stop plate 70 is provided with stop shoulders 73 to limit the swinging movement of the actuating lever in a clockwise direction as viewed in Figure 3.

A retaining spring 27 interposed between the underside of the lever 23 and the bottom plate 18 of the casing 10 presses the lever sockets 26 up against the pointed projections 25. The ends of the spring 27 are engaged with spring seats 28 and 28' formed in the bottom plate 18 and lever 23 respectively. A push pin 29 has its rounded lower end or head 29' bearing down on the underlying end of the lever 24. A spring 30 interposed between the head 29' of the push pin 29 and one end of the push pin holder 31 maintains the head 29' of the push pin 29 engaged with the lever 24. However, in the event of excessively high temperature and consequent abnormal expansion of the volatile charge in the power element 20, the push pin spring 30 yields to prevent the imposition of excessive or destructive stresses on the various levers and associated elements of the unit.

The adjusting lever 24 is pivotally supported on a pivot pin 32 carried by transversely spaced apertured ears 33 depending from the top wall of the control casing. The apertures of the ears 33 are transversely alined with each other and with similar apertures in opposed portions of the peripheral wall 11 of the control casing 10 to provide for convenient assembly of the pivot pin 32 (see Figure 4). One or both ends of pin 32 may be riveted over to secure it in position after assembly. The adjusting lever 24 also has an arm 35 narrower than the arm of the lever 24 carrying the pointed projection 25 and much longer and having a laterally off-set and reduced end 36 controlled as to position from the control knob 39 in a manner which will be hereinafter more fully described. The lever arm 35 may, for manufacturing convenience, be a separate piece overlapped with and spot welded to the other portion of the lever as shown in Figure 4.

A valve operating lever 40 is also provided and at one end is also fulcrumed on the pivot pin 32. The upwardly off-set end 23' of the actuating lever 23 is engaged with a pointed projection or boss 40' which projects downwardly from the underside of the lever 40 adjacent one end thereof and by virtue of the engagement thus provided, the actuating lever 23 controls the position of the valve operating lever 40. The valve operating lever has a lateral extension 42 at one end thereof which overlies and engages the top of the metering valve and also overlies and is engageable with the low fire stop. A light coil spring designated at S is provided to hold the lever 40 down against the lever 23 with sufficient yieldable pressure to cause the lever 40 to follow the movements of the lever.

With this construction, for any given position of the shiftable fulcrum provided by the pointed projection 25 of the adjusting lever 24, the metering valve is opened and closed under the control of the thermostatic power element or bulb 20.

In order to provide for automatic control of any one of the desired number of temperatures within a given operating range, mechanism is provided for shifting the adjusting lever 24 and consequently shifting the fulcrum for the actuating lever 23, and this means includes the knob 39 which is fixed to the upper end of a short shaft 50 rotatably mounted in a bearing bushing 50' provided therefor on the top of the control casing. The lower end of the shaft 50 is provided with cam means designated generally at 51 and including a cam surface 52 on its underface which wipes against the off-set end 36 of the arm 35 of the adjusting lever 24. Consequently, as the cam 50 is turned or rotated the adjusting lever 24 is shifted about its pivot pin 32 to shift the fulcrum projections 25 for the actuating lever 23.

The periphery of the cam means 51 has a flange-like cam 53 which engages a follower finger 54 of a valve closing lever 55 rotatably supported on the casing of the control unit and having an arm 57 designed to engage and force the metering valve closed when allowed to do so by the cam 53. A spring 58 is combined with the valve closing lever and tends to bias it to a position to cause the metering valve to be closed.

In the particular construction shown the valve closing lever 55 has its central opening, which is a rotative fit on a bearing bushing 60, a portion of which is also supported in a bearing opening provided on the peripheral wall of the control casing. The bearing bushing is held in place by a screw 61. The coil spring 58 also encircles this bearing bushing, being interposed between its flange and the valve closing lever and having one end anchored or interhooked with the casing and the other end anchored or interhooked to the valve closing lever.

With this construction, a single operating knob gives the device the desired temperature setting and is also manipulatable to effect complete closing of the valve.

It is to be understood that the low fire stop co-acts with the valve operating lever 40 to limit the extent to which it can move the valve thereof to completely closed position. As disclosed in the Roy W. Johnson application, Ser. No. 215,336, above referred to, the low fire stop comprises an angularly bent piece of sheet metal having a base portion adjustably supported on the casing 1 and an upstanding lug or abutment portion disposed in the path of movement of the valve-operating lever 40. The opening movement of the valve is limited to the high fire stop as fully disclosed in the Roy W. Johnson application, Serial No. 215,336 above referred to. Hence it is necessary to have an operating means to completely close the valve and this is provided in the present instance by the valve closing lever 55 which is cam controlled as above described.

While I have shown and described one construction in which the invention may be advantageously embodied, it is to be understood that the construction shown has been selected merely for the purpose of illustration or example and that various changes in the size, shape and arrangement of the parts may be made without departing from the spirit of the invention or the scope of the subjoined claims.

The invention claimed is:

1. A thermostatically controlled liquid fuel feeding device comprising a casing having a liquid supply chamber provided with an outlet, a metering valve regulating flow through the outlet and biased to open position, means cooperable with the metering valve to limit its opening movement, a thermo-power element connected to the casing, a system of levers actuated by the thermo-power element and including a valve operating lever cooperable with the metering valve and effective when swung in one direction to close the valve and when swung in the other direction to allow the valve to open, a stop cooperable with the valve operating lever to limit the extent to which it is effective to close the valve, one of the levers in said system of levers having a shiftable fulcrum to vary the action of the system of levers under the influence of the thermo-power element, a valve shut-off lever acting when operative to completely close the metering valve, cam means for shifting said fulcrum, cam means for controlling the action of said valve shut-off lever, and a single manually operable control for both of said cam means.

2. A thermostatically controlled liquid fuel feeding device comprising a casing having a liquid supply chamber provided with an outlet, a metering valve regulating flow through the outlet and biased to open position, a control casing secured to the top of said main casing and having a portion overhanging the main casing, a thermo-power element carried by the control casing and depending from the overhanging portion thereof, a system of levers supported in the control casing actuated from said thermo-power element and cooperable with the valve to control the opening and closing movements thereof, means cooperable with the system of levers to limit the extent to which they impart closing movement to the valve, means cooperable with the valve to limit the extent of its opening movement, cam means cooperable with the levers to vary their action and hence vary the temperature at which they are effective under the actuation of the thermo power element to effect opening and closing of the valve, cam means for effecting complete closing of the valve, and a single manually operable element disposed exteriorly of the control casing and connected to said cam means for actuating the same.

3. A thermostatically controlled liquid fuel feeding device comprising a main casing having a liquid supply chamber provided with an outlet, a metering valve regulating flow through the outlet and biased to open position, a control casing supported on the main casing and having a portion overhanging the same, a thermo power element carried by the control casing and depending from the overhanging portion thereof, a system of levers supported in the control casing, actuated by said thermo power element and cooperable with the metering valve to cause the metering valve to open and close under the control of the thermo power element, cam means for varying the action of the system of levers, cam operated means for completely closing the metering valve, and a single manually operable control for both of said cam means.

4. A thermostatically controlled liquid fuel feeding device comprising a main casing having a liquid supply chamber provided with an outlet, a metering valve regulating flow through the outlet and biased to open position, a thermo power element supported adjacent said casing, an actuating lever driven by said thermo power element, an adjusting lever providing a shiftable fulcrum for said actuating lever, a valve operating lever driven by said actuating lever and cooperable with said metering valve, a shut-off lever for said metering valve, and a manually operable control knob having two cams, one cooperable with the adjusting lever and the other cooperable with the valve shut-off lever.

5. A thermostatically controlled liquid fuel feeding device comprising a main casing having a liquid supply chamber provided with an outlet, a metering valve regulating flow through the outlet and biased to open position, a thermo power element supported adjacent said casing, an actuating lever driven by said thermo power element, an adjusting lever providing a shiftable fulcrum for said actuating lever, a valve operating lever driven by said actuating lever and cooperable with said metering valve, a shut-off lever for said metering valve, and a control knob having a peripheral cam for maintaining the valve shut-off lever in operative position except in one angular adjustment of the cam and also having a cam on its underface cooperable with the adjusting lever and having its active portions angularly spaced from the portion of the peripheral cam which permits the valve shut-off lever to function.

6. A thermostatically controlled liquid fuel feeding device comprising a casing having a liquid supply chamber provided with an outlet, a metering valve regulating flow through the outlet and biased to open position, a thermo power element, an actuating lever driven by said thermo power element, a shiftable fulcrum for said actuating lever, a valve operating lever driven by said actuating lever and cooperable with said metering valve, a valve shut-off lever for moving said metering valve to closed position, cam means for shifting said fulcrum, cam means for controlling said valve shut-off lever, and a single control knob for actuating both of said cam means.

7. A thermostatically controlled liquid fuel feeding device comprising a casing having a liquid supply chamber provided with an outlet, a metering valve regulating flow through the outlet and biased to open position, a control unit including a casing supported on the main casing, a thermo power element carried by said control casing, a system of levers in said control casing actuated by said thermo power element and cooperable with the valve for opening and closing the same, means providing a shiftable fulcrum for one of said levers, a valve shut-off lever, cam means for controlling said fulcrum shifting means and said valve shut-off lever, and a single manually operating element disposed exteriorly of the casing and connected to both of said cam means for actuating the same.

ROY W. JOHNSON.
VERNON R. PAWELSKY.